US006336318B1

(12) United States Patent
Falce et al.

(10) Patent No.: US 6,336,318 B1
(45) Date of Patent: Jan. 8, 2002

(54) ION THRUSTER HAVING A HOLLOW CATHODE ASSEMBLY WITH AN ENCAPSULATED HEATER, AND ITS FABRICATION

(75) Inventors: Louis Raymond Falce, San Jose; John R. Beattie, Westlake Village, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/496,889

(22) Filed: Feb. 2, 2000

(51) Int. Cl.[7] .................................................. F03H 1/00
(52) U.S. Cl. ................ 60/202; 313/231.31; 313/362.1; 315/111.81; 445/29
(58) Field of Search ....................... 60/202; 315/111.81; 313/231.31, 362.1; 445/23, 29

(56) References Cited

U.S. PATENT DOCUMENTS 2,508,266 A  *  5/1950  Jonker ...................... 445/29 X 5,924,277 A     7/1999  Beattie et al.

OTHER PUBLICATIONS

Reaves, et al. "Directly Heated Tungsten Dispenser Cathodes for Ion Laser Application" (Nov.–Dec. 1969) Laser Journal, 4 pages.

* cited by examiner

Primary Examiner—Timothy S. Thorpe
Assistant Examiner—Ehud Gartenberg
(74) Attorney, Agent, or Firm—T. Gudmestad

(57) ABSTRACT

An ion thruster has a hollow cathode assembly including a heater with an inner ceramic sleeve and an outer ceramic sleeve. The outer ceramic sleeve overlies the inner ceramic sleeve with a filament volume between the two sleeves. A wound filament has windings disposed within the filament volume, and a mass of ceramic powder fills the remaining portion of the filament volume between the windings of the filament. A cathode is disposed within the inner ceramic sleeve of the heater. The heater is assembled by preparing the filament and forming it into a wound cylinder, and then encapsulating it and the powder between the inner and the outer ceramic sleeves. The hollow cathode assembly may serve as a portion of a plasma source or as a portion of a charge neutralizer.

17 Claims, 4 Drawing Sheets

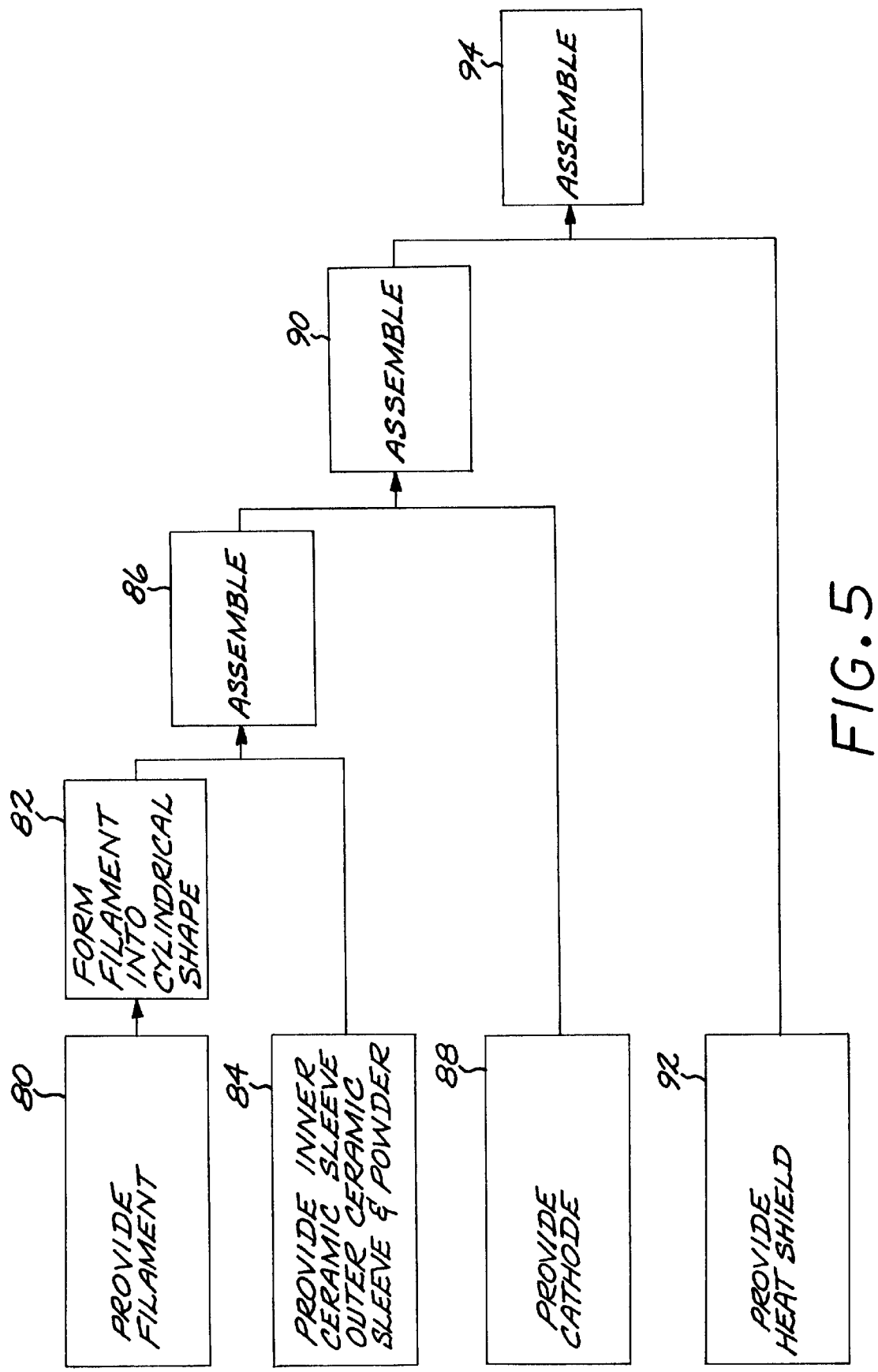

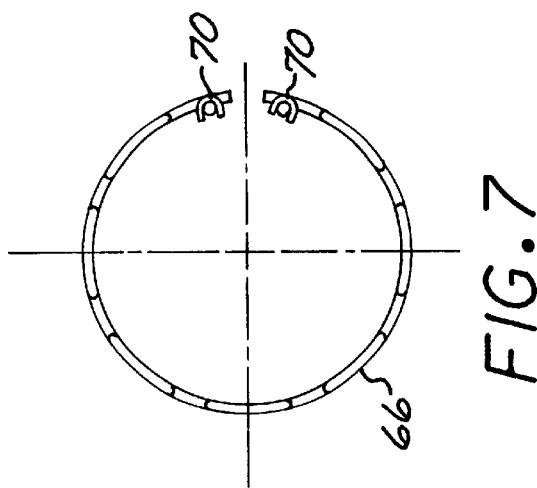
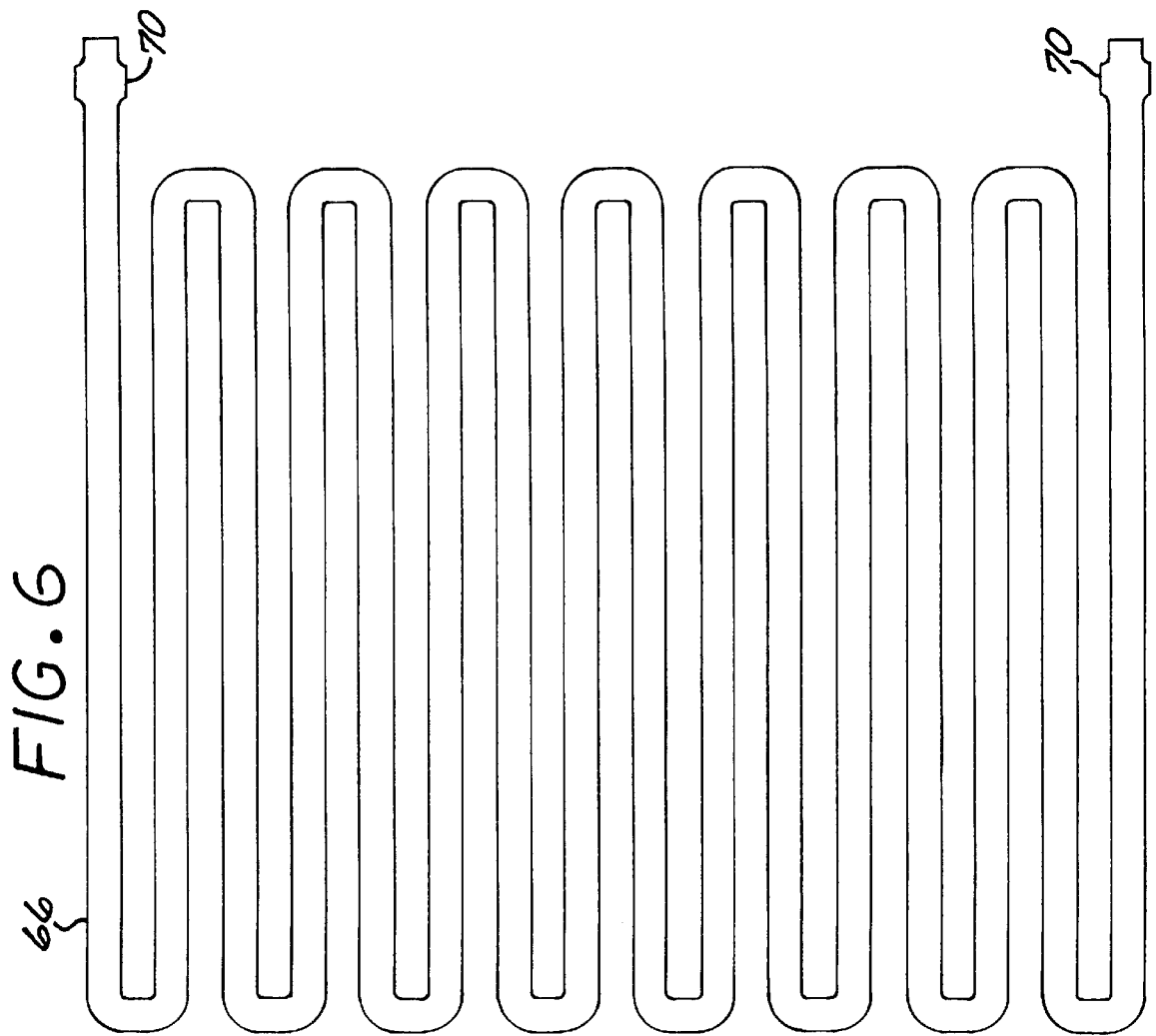

ION THRUSTER HAVING A HOLLOW CATHODE ASSEMBLY WITH AN ENCAPSULATED HEATER, AND ITS FABRICATION

BACKGROUND OF THE INVENTION

This invention relates to ion thrusters and, more particularly, to the structure and method of fabrication of electron sources used in ion thrusters.

Ion thrusters are used in spacecraft such as communications satellites for stationkeeping and other functions. An important advantage of the ion thruster over an engine using chemical propellants is that it utilizes the electrical power generated by the solar cells of the satellite to achieve the propulsion. The ion thruster requires relatively small amounts of a consumable propellant that is ionized, and it is not necessary to lift large masses of chemical fuel to orbit. The ion thruster also has a high specific impulse, making it an efficient engine which requires very little propellant.

In an ion thruster, a plasma of ions and electrons is created by ionizing a flow of the consumable propellant with electrons emitted by a cathode assembly. The plasma is confined within the body of the ion thruster. Positively charged propellant ions are electrostatically extracted from the plasma and accelerated rearwardly by an ion-optics system. The reaction with the spacecraft drives it forwardly, in the opposite direction. The excess ionic charge due to the ejection of the positive ion beam, which may cause undesirable negative charging of the exterior surface of the spacecraft, is neutralized by the injection of electrons.

Free electrons are generated in the ion thruster at two different locations and for two different purposes. One is in the discharge cathode assembly that generates the electrons used to ionize the injected propellant, thereby forming the plasma. The other is the neutralizer assembly.

Such electron sources generally include an electrical resistance heater that heats a cathode, which in turn emits electrons. In the current technology, the heater is manufactured by swaging a coaxial arrangement consisting of a heater element, its outer sheath, and an insulator that separates them. This coaxial arrangement is coiled on a mandrel to form the heater, which is then assembled over the cathode tube. While operable to produce cathode assemblies, this approach has experienced a low yield of acceptable final articles. The inventors have determined that the low yield is largely due to a lack of controllability of the swaging process. Accordingly, there is a need for a better approach to the structure and fabrication of cathode assemblies for use in ion thrusters. The present invention fulfills this need, and further provides related advantages.

SUMMARY OF THE INVENTION

The present invention provides a hollow cathode assembly for use in the discharge chamber or neutralizer of an ion thruster, and a method for its fabrication. The hollow cathode assembly has a physical structure unlike prior structures. The new physical structure allows the use of a fabrication approach which is more controlled than prior, alternative fabrication techniques. The result is an improved hollow cathode assembly, with higher manufacturing yields.

In accordance with the present invention, an ion thruster comprises a hollow cathode assembly. The hollow cathode assembly comprises a heater including an inner ceramic sleeve having an outer surface, and an outer ceramic sleeve having an inner surface. The outer ceramic sleeve overlies the inner ceramic sleeve with a filament volume between the outer surface of the inner ceramic sleeve and the inner surface of the outer ceramic sleeve. The heater further has a wound filament having windings disposed within the filament volume, and a mass of ceramic powder filling a remaining portion of the filament volume between the windings of the filament. A cathode is disposed within the inner ceramic sleeve of the heater. A heat shield desirably overlies the outer ceramic sleeve to improve the efficiency of the heater. The hollow cathode assembly may be used as the electron source in either the discharge cathode assembly (plasma source) or the charge neutralizer, or both.

This new physical structure of the hollow cathode assembly is conducive to the utilization of a well-controlled, highly reliable fabrication procedure. In accordance with this aspect of the invention, a method for making an ion thruster having a hollow cathode assembly includes the preparation of the hollow cathode assembly by the steps of preparing a filament, forming the filament into a cylindrical shape, providing an inner ceramic sleeve, an outer ceramic sleeve, and a mass of ceramic powder, positioning the filament and the mass of ceramic powder between the inner ceramic sleeve and the outer ceramic sleeve, providing a cathode, and positioning the cathode within the interior of the inner ceramic sleeve. The heat shield may be assembled over the exterior of the outer ceramic sleeve. This approach has the advantage that the various components, particularly the filament, may be separately fabricated and inspected, prior to assembly. The assembly does not involve any steps which are difficult to apply reproducibly, such as swaging.

The present approach thus provides a new physical structure and a new fabrication technique for ion thrusters that improve the manufacturing yield. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a block flow diagram of an approach for practicing the present invention;

FIG. 6 is a plan view of a filament prior to forming into a cylindrical shape; and FIG. 7 is an elevational view illustrating the manner of forming the filament into a cylindrical shape.

DETAILED DESCRIPTION OF THE INVENTION

Figure 1:
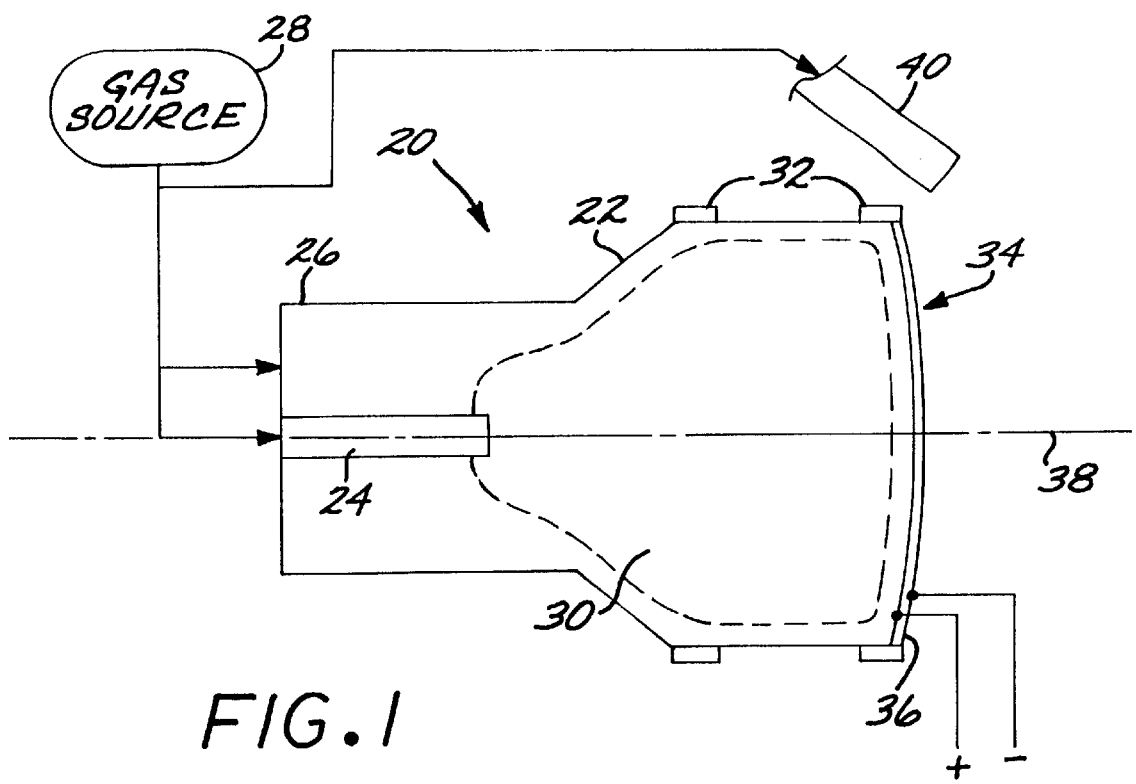
FIG. 1 is a schematic sectional depiction of an ion thruster.

FIG. 1 depicts in general form an ion thruster 20. Ion thrusters are known in the art, except for the improvements to the hollow cathode assembly to be discussed herein. See, for example, U.S. Pat. No. 5,924,277. Accordingly, only the basic features of the ion thruster 20 are described here for reference and for establishing the setting of the hollow cathode assembly.

The ion thruster 20 includes a discharge cathode assembly 24 at a first end 26 of an overlying housing 22. A propellant gas, such as xenon from a source 28, is injected into the housing 22 at the first end 26 and through the discharge cathode assembly 24 and a neutralizer cathode 40. Electrons emitted from the discharge cathode assembly 24 ionize the propellant gas, creating a plasma 30 of electrons and positively charged ions within a central portion of the housing 22. Magnets 32 help to confine and shape the plasma 30.

Ions are electrostatically extracted from the plasma 30 by an ion-optics system 34 at a second end 36 of the housing 22 and accelerated out of the housing 22 (to the right in FIG. 1), generally along an axis of thrust 38 as an ion beam. The housing 22 is generally symmetrical about the axis of thrust 38 in the preferred embodiment. The ionic mass accelerated to the right in FIG. 1 drives the housing 22, and the spacecraft to which it is affixed, to the left in FIG. 1. The ionic charge of the ion beam, which otherwise may charge the external surface of the spacecraft, may be neutralized by injection of electrons into the ion beam by the electron charge neutralizer 40.

Figure 2:
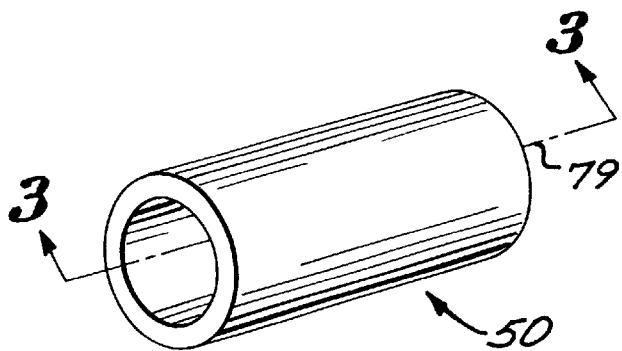
FIG. 2 is a perspective view of a hollow cathode assembly used in an ion thruster.
Figure 3:
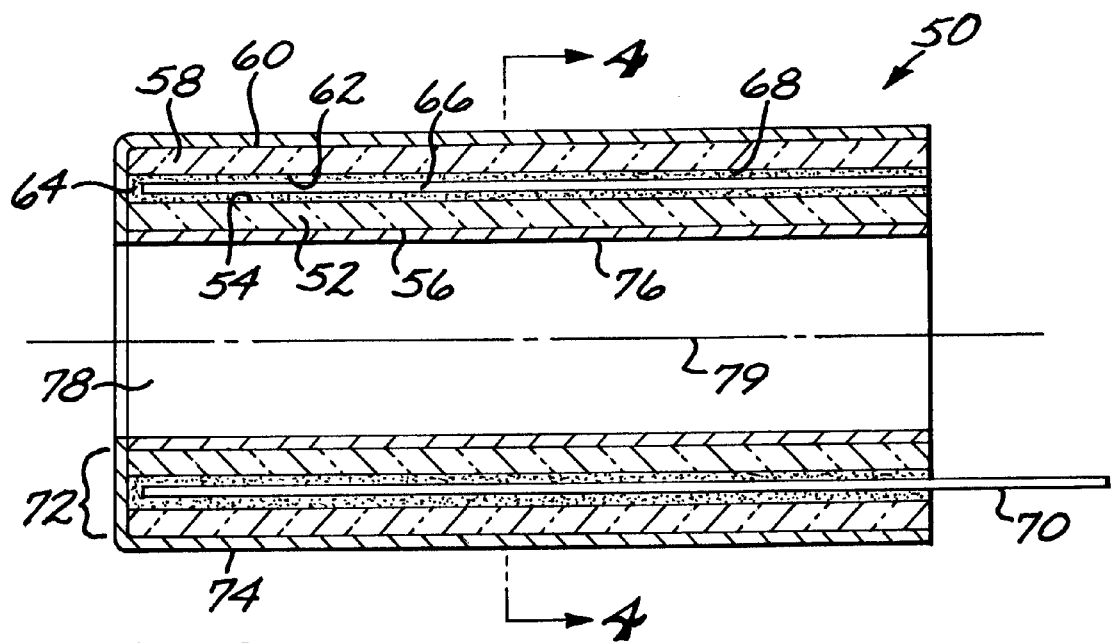
FIG. 3 is a sectional view of the hollow cathode assembly of FIG. 2, taken on line 3—3.
Figure 4:
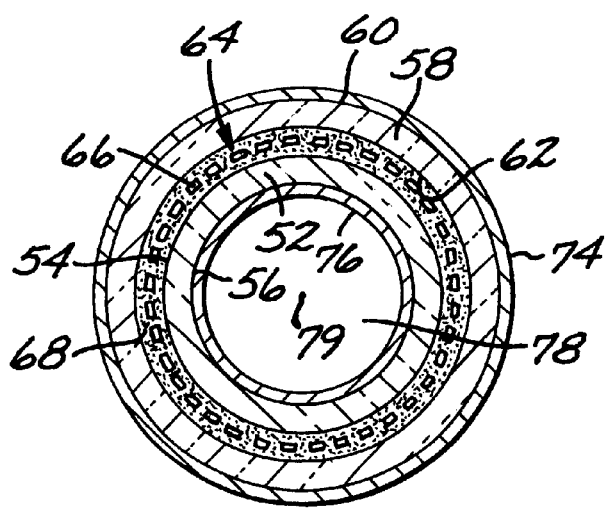
FIG. 4 is a sectional view of the hollow cathode assembly of FIG. 3, taken on lines 4—4.

The discharge cathode assembly (plasma source) 24 and/or the electron charge neutralizer 40 each include sources of free electrons in the form of a hollow cathode assembly 50, illustrated in FIGS. 2–4. FIG. 2 illustrates the external view of the hollow cathode assembly 50. In the preferred embodiment, the hollow cathode assembly 50 is generally in the form of a hollow right circular cylinder having a cylindrical axis 79.

FIGS. 3 and 4 depict the hollow cathode assembly 50 in sectional views. The hollow cathode assembly 50 includes an inner ceramic sleeve 52 having an outer surface 54 and an inner surface 56. An outer ceramic sleeve 58 has an outer surface 60 and an inner surface 62. The outer ceramic sleeve 58 overlies the inner ceramic sleeve 52, with an annular filament volume 64 between the outer surface 54 of the inner ceramic sleeve 52 and the inner surface 62 of the outer ceramic sleeve 58. A filament 66 having serpentine windings is disposed in the annular filament volume 64, between the outer ceramic sleeve 58 and the inner ceramic sleeve 52.

The filament 66 occupies only a portion of the filament volume 64. The remaining portion of the filament volume is filled with a mass of ceramic powder 68. The mass of ceramic powder 68 lies between the windings of the filament 66 to prevent them from contacting each other and shorting. Leads 70 extend from the ends of the filament 66. The inner ceramic sleeve 52, the outer ceramic sleeve 58, the filament 66, and the mass of ceramic powder 68 form a heater 72. Optionally but preferably, a heat shield 74 overlies the outer surface 60 of the outer ceramic sleeve 58 and forms part of the heater 72, to reflect heat inwardly and increase the efficiency of the heater 72.

A cathode 76 is disposed inwardly of the inner surface 56 of the inner ceramic sleeve 52. The cathode 76 is preferably in an annular form that contacts the inner surface 56 of the inner ceramic sleeve 52.

In operation, an electrical current is passed through the filament 66. The heat generated by resistance heating of the filament 66 is transmitted to the cathode 76, heating the cathode 76. Electrons are emitted from the cathode 76 into a hollow interior 78 of the hollow cathode assembly 50. Where the hollow cathode assembly 50 is part of the discharge cathode assembly 24, the propellant gas flows through the hollow interior 78 and is ionized by the emitted electrons. Where the hollow cathode assembly 50 is part of the electron charge neutralizer 40, propellant gas flows through the hollow interior and is ionized by the emitted electrons. Emitted electrons flow from the end of the hollow cathode assembly 50 to neutralize positive charges in the ion beam.

The inner ceramic sleeve 52, the outer ceramic sleeve 58, and the mass of ceramic powder 68 are all preferably aluminum oxide ($Al_2O_3$) or magnesium oxide (MgO). These ceramics are electrical insulators, but have moderately good heat conduction. The filament 66 is preferably an alloy of tungsten-3 weight percent rhenium. The heat shield 74 is preferably tantalum. The cathode 76 is preferably porous tungsten impregnated with a mixture of barium carbonate, calcium carbonate, and aluminum oxide.

In a preferred hollow cathode assembly 50, the cylindrical assembly a right circular cylinder about 1 inch long, the inner diameter of the inner ceramic sleeve 52 is about 0.253 inch, the outer diameter of the inner ceramic sleeve 52 is about 0.345 inch, the inner diameter of the outer ceramic sleeve 58 is about 0.365 inch, and the outer diameter of the outer ceramic sleeve 58 is about 0.450 inch. The filament 66 is preferably a flat ribbon with a thickness of about 0.005 inch and a width of about 0.035 inch. The mass of ceramic powder is aluminum oxide powder, packed around the filament 66 between the sleeves 52 and 58. The heat shield 74 is about 0.0005 inch thick. The cathode 76 is a cylinder that contacts the inner surface 56 of the inner ceramic sleeve 52. The materials of construction and dimensions presented in this and the prior paragraph are for a preferred construction. They are not limiting of the invention, which is more broadly applicable.

FIG. 5 is a block flow diagram depicting a preferred approach for fabricating the hollow cathode assembly 50. The filament 66 is provided, numeral 80. The filament 66, illustrated in FIG. 6 in its as-provided form, is preferably a wound serpentine with the leads 70 extending therefrom. The filament 66 is formed into a cylindrical shape, numeral 82, and FIG. 7 illustrates the formed filament 66. The filament 66 is desirably formed so that the long legs of the serpentine lie parallel to the axis 79 of the cylinder, with the leads 70 adjacent to each other. The filament may instead be wound circumferentially as a helix. This approach is less preferred, however, because the leads are accessible at the opposite ends of the hollow cathode assembly 50, and it is preferred that they be accessible at the same end as in the approach of FIGS. 6 and 7.

The inner ceramic sleeve 52, the outer ceramic sleeve 58, and the mass of ceramic powder 68 are provided, numeral 84. The filament 66 is assembled, numeral 86, between the two sleeves 52 and 58, with the mass of ceramic powder 68 filling the remaining portion of the filament volume 64. This assembly is accomplished by gradually sliding the solid components together, and adding ceramic powder as necessary to the filament volume 64. The cathode 76 is provided, numeral 88, and assembled, numeral 90, to the subassembly of inner ceramic sleeve 52, outer ceramic sleeve 58, filament 66, and mass of ceramic powder 68. The heat shield 92 is provided, numeral 92, and assembled, numeral 94, to the subassembly of inner ceramic sleeve 52, outer ceramic sleeve 58, filament 66, mass of ceramic powder 68, and cathode 76. The order of the assembly steps may be altered as convenient and as may be operable. For example, the heat shield assembly may be prior to the cathode assembly.

The fabrication of the hollow cathode assembly 50 is complete. It may then be integrated into the associated structure of either the discharge cathode assembly 24 or the electron charge neutralizer 40.

This fabrication procedure is orderly and fully predictable. Each component may be fully inspected prior to assembly, and there is little likelihood of damage or misalignment during the various assembly steps. This assembly approach is to be contrasted with a prior approach to fabricating hollow cathode assemblies, in which the various elements were swaged together. In the swaging, ceramic components were intentionally fragmented, but the fragmentation was somewhat unpredictable. Other components were easily damaged, and the final product had a high degree of variability. The present approach avoids this approach and these problems, leading to a high degree of predictability in the final product and a high yield of good parts.

A hollow cathode assembly has been constructed with the structure and fabrication method described above.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An ion thruster comprising a hollow cathode assembly, the hollow cathode assembly comprising:
   a heater including
      an inner ceramic sleeve having an outer surface,
      an outer ceramic sleeve having an inner surface, the outer ceramic sleeve overlying the inner ceramic sleeve with a filament volume between the outer surface of the inner ceramic sleeve and the inner surface of the outer ceramic sleeve,
      a wound filament having windings disposed within the filament volume, and
      a mass of ceramic powder filling a remaining portion of the filament volume between the windings of the filament; and
   a cathode disposed within the inner ceramic sleeve of the heater.

2. The ion thruster of claim 1, wherein the inner ceramic sleeve and the outer ceramic sleeve are made of a ceramic selected from the group consisting of aluminum oxide and magnesium oxide.

3. The ion thruster of claim 1, wherein the ceramic powder is selected from the group consisting of aluminum oxide powder and magnesium oxide powder.

4. The ion thruster of claim 1, wherein the filament is made of a material comprising tungsten-3 weight percent rhenium.

5. The ion thruster of claim 1, wherein the filament is in the form of a flat ribbon.

6. The ion thruster of claim 1, wherein the cathode is made of a material comprising porous tungsten impregnated with barium carbonate, calcium carbonate, and aluminum oxide.

7. The ion thruster of claim 1, wherein the hollow cathode assembly comprises a portion of a charge neutralizer.

8. The ion thruster of claim 1, wherein the hollow cathode assembly comprises a portion of a plasma source.

9. The ion thruster of claim 1, further including
   a heat shield overlying the outer ceramic sleeve.

10. A method of making an ion thruster having a hollow cathode assembly, the method including the preparation of the hollow cathode assembly by the steps of:
    preparing a filament;
    forming the filament into a cylindrical shape;
    providing an inner ceramic sleeve, an outer ceramic sleeve, and a mass of ceramic powder;
    positioning the filament and the mass of ceramic powder between the inner ceramic sleeve and the outer ceramic sleeve;
    providing a cathode;
    positioning the cathode within the interior of the inner ceramic sleeve;
    attaching said cathode assembly to said ion thruster.

11. The method of claim 10, wherein the step of preparing the filament includes the step of
    forming a metallic piece into a wound shape.

12. The method of claim 10, wherein the step of forming the filament includes the step of
    forming the filament into a right circular cylindrical shape.

13. The method of claim 10, wherein the step of providing an inner ceramic sleeve, an outer ceramic sleeve, and a mass of ceramic powder includes the step of
    providing an inner ceramic sleeve comprising a ceramic selected from the group consisting of aluminum oxide and magnesium oxide, an outer ceramic sleeve comprising a ceramic selected from the group consisting of aluminum oxide and magnesium oxide, and ceramic powder comprising a ceramic selected from the group consisting of aluminum oxide powder and magnesium oxide powder.

14. The method of claim 10, wherein the step of providing a cathode includes the step of
    providing porous tungsten impregnated with barium carbonate, calcium carbonate, and aluminum oxide.

15. The method of claim 10, including an additional step of
    positioning a heat shield over the outer ceramic sleeve.

16. The method of claim 10, including an additional step of
    assembling the hollow cathode assembly into a plasma source.

17. The method of claim 10, including an additional step of
    assembling the hollow cathode assembly into a charge neutralizer.

* * * * *